United States Patent [19]

Warner

[11] Patent Number: 5,641,068
[45] Date of Patent: Jun. 24, 1997

[54] ADJUSTABLE AND REUSABLE PROTECTIVE PACKAGING SYSTEM

[75] Inventor: Gary J. Warner, Weimar, Calif.

[73] Assignee: Hewlett-Packard Company, Palo Alto, Calif.

[21] Appl. No.: 490,842

[22] Filed: Jun. 15, 1995

[51] Int. Cl.⁶ .................... B65D 81/02; B65D 85/30
[52] U.S. Cl. .................. 206/523; 206/588; 206/590; 206/591; 206/593
[58] Field of Search ....................... 206/521, 523, 206/524, 585, 586, 588, 591, 593, 594, 722, 723, 590

[56] References Cited

U.S. PATENT DOCUMENTS

| | | | |
|---|---|---|---|
| 3,266,705 | 8/1966 | Wood | 206/523 |
| 3,273,779 | 9/1966 | Mykleby | 206/523 |
| 3,446,341 | 5/1969 | Kutik | 206/722 |
| 4,241,829 | 12/1980 | Hardy | 206/523 |
| 4,503,972 | 3/1985 | Nelligan | 206/588 |
| 4,560,069 | 12/1985 | Simon | 206/523 |
| 4,602,715 | 7/1986 | Sarver et al. . | |
| 4,640,418 | 2/1987 | Lowry | 206/588 |
| 4,714,169 | 12/1987 | Keenan et al. . | |
| 4,724,976 | 2/1988 | Lee . | |
| 4,746,059 | 5/1988 | Jackson . | |
| 4,785,957 | 11/1988 | Beck et al. . | |
| 4,790,120 | 12/1988 | Manduley et al. . | |
| 4,807,808 | 2/1989 | Reed . | |
| 4,809,851 | 3/1989 | Oestreich, Jr. et al. . | |
| 4,848,062 | 7/1989 | Manduely et al. . | |
| 4,969,312 | 11/1990 | Pivert et al. . | |
| 5,160,473 | 11/1992 | Bontrager | 206/523 |
| 5,213,215 | 5/1993 | Prevot | 206/588 |
| 5,236,088 | 8/1993 | Dhority et al. | 206/523 |
| 5,441,170 | 8/1995 | Bane, III | 206/523 |

Primary Examiner—David T. Fidei
Attorney, Agent, or Firm—Douglas M. Gilbert

[57] ABSTRACT

A reusable shipping container assembly for protecting a plurality of articles during shipping is disclosed. The container assembly includes a semi-rigid rectangular corrugated box having a top wall, a bottom wall and side walls. Within the corrugated box are a plurality of interlocking cushioned "clamps;" one such clamp per article to be shipped. Each interlocking cushioned clamp contains a convoluted foam set consisting of a pair of rectangular-shaped interlocking convoluted foam cushions. Each pair of convoluted foam cushions holds one of the articles to be shipped. Completing the cushioned clamp and enclosing the convoluted foam cushions is a cushioned sleeve having a rectangular cross section. The cushioned sleeve is adapted to snugly enclose the convoluted foam cushions on four sides and to maintain the interlocking convoluted foam cushions in place during shipping. The plurality of cushioned clamps fits snugly within the corrugated box leaving only a narrow recess between the top wall of the box and the top of the interlocking cushions to provide a region of expansion for compensating odd sized or bulky articles.

15 Claims, 7 Drawing Sheets

ADJUSTABLE AND REUSABLE PROTECTIVE PACKAGING SYSTEM

BACKGROUND OF THE INVENTION

This invention pertains generally to protective packaging and shipping container systems, and more particularly, to an economical reusable protective packaging system particularly well suited in packing and shipping delicate parts that can be damaged by impact and/or vibration encountered during transit.

In manufacturing finished products some form of packaging is typically needed to handle, store, or transport the manufactured parts and from manufacturing and distribution sites to customer locations, and often, from customer locations back to the manufacturer. In the electronics and related industries, packaging must not only provide a convenient container for shipping or storage, but must also protect against physical damage caused by impact shock and/or vibration. Although specialty containers are sometimes used for products having odd shapes or for ultra-delicate parts, corrugated boxes (sometimes called cardboard cartons) with some form of internal cushioning or resilient restraints are the basic vehicle primarily used to provide the packaging for the vast majority of manufactured products.

The number of different corrugated boxes needed to accommodate the many different products of diverse character is tremendous due to the multitude of different products and the variations in size and shape thereof. There are perhaps thousands of unique packaging designs in order to suit the requirements of individual parts, and the multitude of different containers leads to the costly administration of part numbers and container inventory. This in turn leads to higher prices per unit for small quantities of each unique item, since the individual container can be a significant part of the cost of the item. In an attempt at reducing the number of unique packaging designs, container suppliers have designed multifunctional container systems capable of protecting many different parts of various shapes and sizes. A few such multifunctional container systems have been used for many years to provide reasonable flexibility for packaging parts of varying sizes and shapes by using simple materials such as Styrofoam or polyurethane-like foam in conjunction with corrugated boxes.

One such container system uses small foam cushioning "pillows" for packaging a part of almost any shape. The manufacturer/shipper forms the pillows at the manufacturing site using proprietary chemicals. Today, use of these foam cushion pillows is on the decline due to cost factors, chemical outgassing problems encountered during formation of the pillows, and personal hazards in handling the chemical that make up the pillows. A second type of container system uses loose fill Styrofoam "peanuts" glued together with a resin and then overlaid with a plastic sheet. The part to be shipped is then pressed or molded into this bed of cushioned material and then overlaid with another plastic sheet and more foam and resin before being placed inside a corrugated box. Although this has the flexibility of packaging parts of various sizes and shapes, it uses glued Styrofoam cushions that are not reusable. Once used, the cushions or pillows become largely deformed into a pulp which does not fit the original shape of the part originally shipped. The process is labor and equipment intensive, is not particularly economical, particularly since it cannot be reused, and there is a disposal problem of the foam cushions. In general packaging systems that rely on a mold-in-place package will only fit one unique part (once formed) and cannot be reused for shipping other parts of different size or shape. Recycling and reuse considerations are essential in designing new packaging devices, not only for cost reasons, but for environmental reasons also.

One particular problem common among economy-type packaging restraints is that side or lateral restraint protection is often inadequate to prevent damage to an article and in some cases is ignored altogether. For example convoluted foam packs having an upper and lower mating set are a common type of shipping restraint used in conjunction with corrugated boxes. Although convoluted foam provides plenty of protection on the top and bottom of a part, lateral support is often left to chance. If the part is relatively thin with a smooth profile or has been sealed in an electrostatic plastic wrap as is commonly done, the part can easily slip from side to side when a lateral shock load is imparted to the package. This can result in damage when the part hits the inside of the box, depending on the magnitude of the shock load and the fragility of the part. Or, if the part approximates the length or width of the foam set (which also equals the internal size of the container), then little or no room is left to protect the part from lateral impact shocks. The same basic problem exists with the ubiquitous peanut (a.k.a. popcorn) foam that is loosely filled into a box with the part to be shipped. Vibration can cause the part to shift in transit to one side or another, so that a sharp impact on the unprotected side can damage the part. Bubble wrap also suffers a similar restraint problem. As is known in the industry, improperly trained personnel often leave the ends of a part open after wrapping three or more layers around a part to be shipped. Elongated parts are often difficult to wrap properly with bubble wrap, and therefore, the ends of a part are prone to impact damage during shipping. In addition, bubble wrap is relatively expensive, labor intensive and requires trained personnel to properly install.

What is needed is an economical and reusable packaging design that is also environmentally sound and that reduces the variety of packages to be procured while assuring individual protection of each part which is packaged.

What is also needed is a reusable packaging design that will also accommodate virtually any part or product shape and has multiple packaging configurations to reduce the variety of different containers and packaging systems to be procured, inventoried and warehoused.

SUMMARY OF THE INVENTION

In accordance with the teachings of the present invention, these and other objectives are achieved through a novel shipping container assembly for protecting an article during shipping and storage. The container assembly has an outer semi-rigid corrugated box with a top and bottom wall and a plurality of side walls of depth "d." The box has a plurality of corrugated flaps that are folded and fastened together to form the top and bottom walls. On the interior of the box, in the simplest form of the invention, are three resilient cushions employed in such a manner to produce an integral block of cushion material that protect all sides of an article to be shipped. The first cushion acts as a sleeve or interior wall liner. It covers at least a substantial portion of the corrugated box side walls and forms a hollow center section. The first cushion provides supplementary lateral shock protection to any article placed within the hollow center section thereof. The second and third flexible cushions are made of pliable convoluted foam and fit within the hollow center section of the box. The second cushion rests on the bottom wall of the box and abuts the cushion liner when properly disposed within the box. The third or uppermost cushion has a conforming convoluted bottom surface for mating with the convoluted upper surface of the second cushion. The article to be shipped goes between the convoluted surfaces of the second and third cushions to protect it from shock loads. The present invention seeks to mitigate the drawback of convoluted cushions allowing the article to shift from side to side by clamping the article securely in place. This is the effect of the cushioned sleeve in combination with the pair of mating convoluted cushions. In addition, both second and third cushions have an average thickness $<\frac{1}{2} d$ so that when disposed within the box, a recess is created between the top of the box and the upper portion of the associated cushion. The provision of a recess advantageously permits the container assembly to accommodate articles of varying shapes and sizes.

In another aspect of this invention, a second reusable shipping container assembly protects a plurality of small articles during shipping. This container assembly uses a similar semi-rigid rectangular corrugated box with a top wall, a bottom wall and side walls. Within the corrugated box are a plurality of interlocking cushioned "clamps;" one such clamp per article to be shipped. Each interlocking cushioned clamp contains a convoluted foam set consisting of a pair of rectangular-shaped interlocking convoluted foam cushions. Each such convoluted foam cushion has at least one convoluted side for engaging a convoluted side of its corresponding pair. Each pair of convoluted foam cushions holds therebetween one of the articles. Completing the cushioned clamp and enclosing the convoluted foam cushions is a cushioned sleeve having a rectangular cross section. The cushioned sleeve is adapted to snugly enclose the convoluted foam cushions on four sides and to retain the interlocking convoluted foam cushions in place. The plurality of cushioned clamps fits snugly within the corrugated box leaving only a narrow recess between the top wall of the box and the top of the interlocking cushions to provide a region of expansion for compensating odd sized articles.

BRIEF DESCRIPTION OF THE DRAWINGS

For a better understanding of the invention as well as other objects and further features thereof, reference is made to the accompanying drawings wherein.

DETAILED DESCRIPTION

Figure 1:
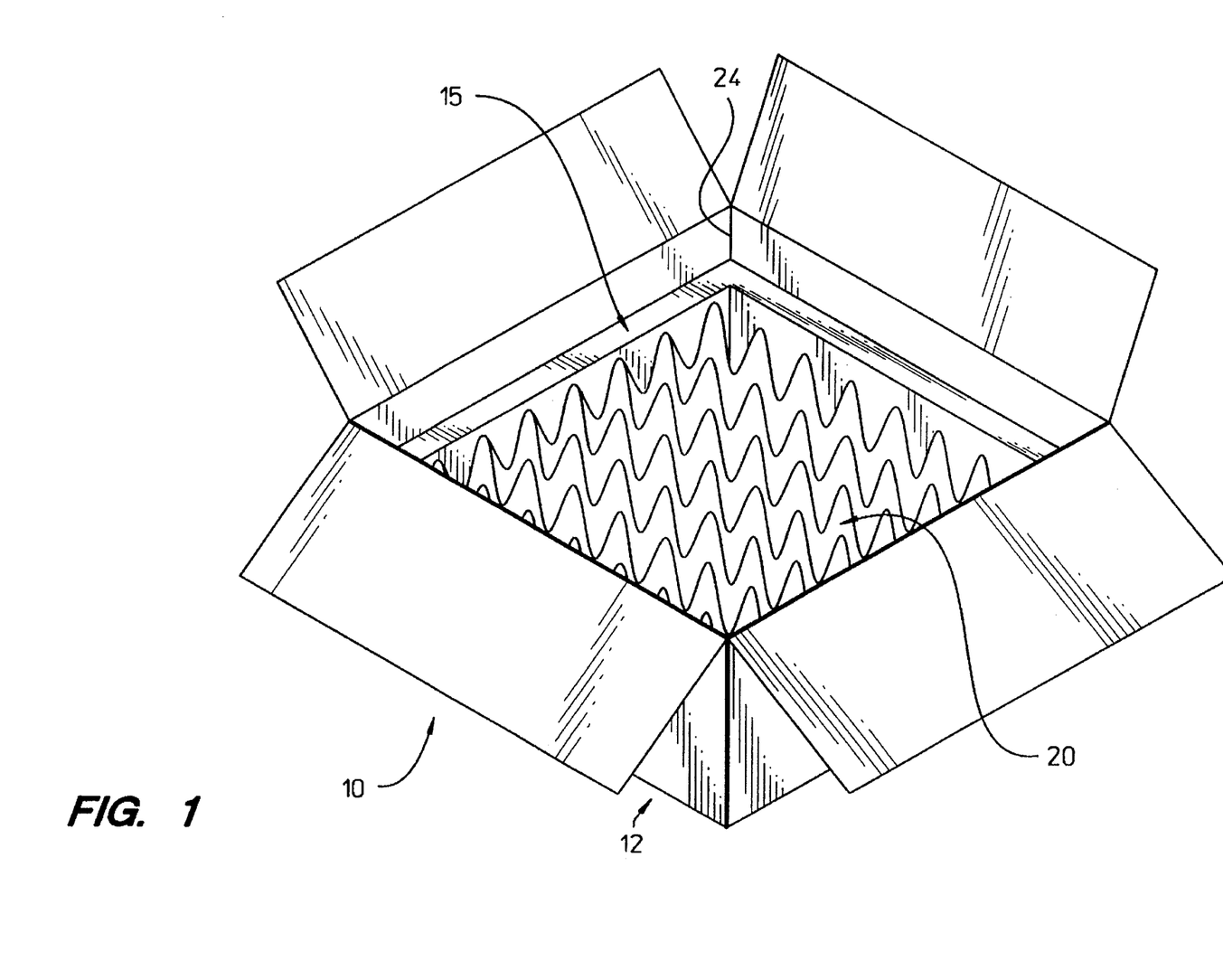
FIG. 1 is a perspective view of a portion of one embodiment of the present invention.
Figure 2:
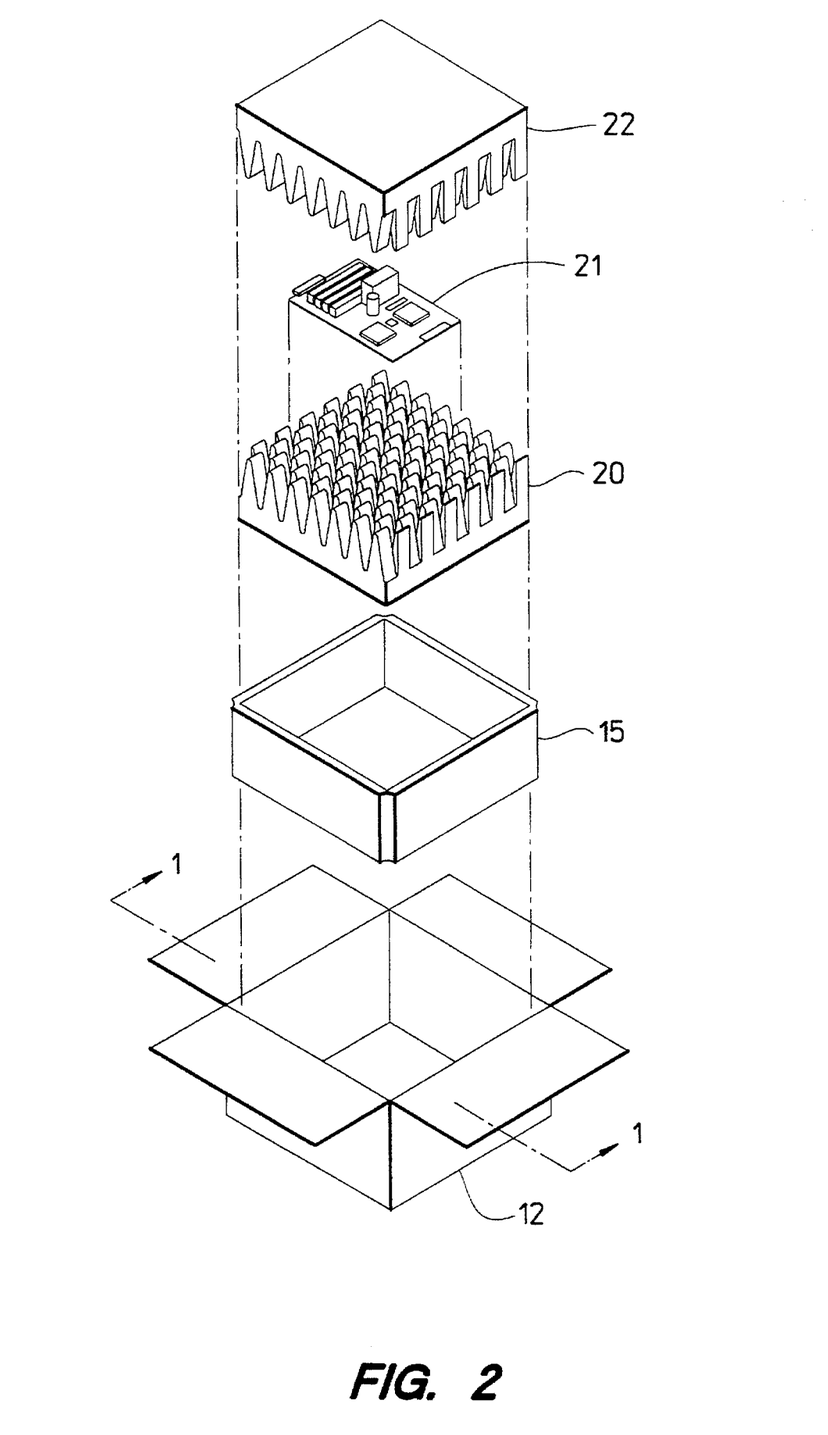
FIG. 2 is an exploded perspective view of the container assembly shown in FIG. 1.

For a better understanding of the subject invention, reference is made to the following description and to the above-described drawings. FIG. 1 depicts one aspect of the present invention in which three component parts are shown in a partially assembled relationship. FIG. 2 depicts all four components of one embodiment of a shipping container assembly 10 in an exploded relationship with a typical part 21 having an irregular contour (shown as a pc board) assembly to be packaged and readied for shipment or storage. Referring to both figures, the container assembly 10 consists of an outer semi-rigid corrugated box 12, a flat flexible cushion liner 15 (acting as an inner sleeve), a bottom (as shown) convoluted foam cushion 20 and an upper mating convoluted foam cushion 22 (shown only in FIG. 2). Corrugated box 12 is a standard rectangular box design having four top flaps, as shown, and four bottom flaps (not shown). The four top flaps form the top wall when properly folded and fastened together, and the four bottom flaps form the bottom wall when properly folded and fastened together. When closed the top and bottom walls seal the contents of box 12 prior to shipment or storage. The wall thickness, glue type, and other design variables of box 12 are all defined by the normal parameters used to determine these items (e.g., burst requirements). Cushion liner 15 is a removable foam cushion that when properly disposed within box 12 covers a major portion of the inside walls thereof. In the preferred embodiment, liner 15 is made by taking a rectangular block or brick-like piece of polyurethane foam and cutting through it along its outer edge to form a single picture frame type of liner having a nominal 2.5 cm 8.5 cm thickness. This serves variously as lateral protective cushioning for shock absorption of part 21 and as a locator and guide sleeve for inner foam cushions 20 and 22. Cushions 20 and 22 are preferably formed from the same foam block from which liner 15 is made. Cushions 20 and 22 have convoluted foam, "finger-like" surfaces which mate with each other and perform a clamping function when pressed together. As shown in FIG. 2 cushions 20 and 22, being virtually identical in size and shape, can be interchanged from one position to the other. And, being made of a foam material will conform to the outer contour of a wide range of parts to be packaged. (The preferred foam density is typically a function of the weight of part 21 to be shipped, which is customary in the trade.)

Cushion liner 15 has the same outer dimensions as the interior side walls of box 12, except that the height of liner 15 is less than the height of the side walls so as to produce, when disposed within box 12, recess 24 between the top of box 12 and the upper portion of liner 15. Similarly the vertical width of convoluted foam cushions 20 and 22 are such that when disposed within box 12 (without part 21 to separate the cushions), there is a similar recess between the top of box 12 and the upper portion of foam cushion 22. The provision of recess 24, which is a principal feature of this invention, advantageously permits container assembly 10 to accommodate parts of varying shapes, sizes and contours. For example, a part having a greater vertical dimension than the pc board 21 shown in FIG. 2, may cause all or a portion of upper cushion 22 to bulge upwardly. Recess 24 being a void space permits cushion 22 to expand to accommodate large parts without significantly compressing the foam which could, if compressed, adversely affect its shock absorbing properties.

The three cushions 15, 20 and 22 when properly assembled in the configuration shown in FIG. 2 within box 12 serve to protect part 21 by providing shock absorption on all sides thereof—not just the top and bottom faces. Cushion liner 15 serves to protect part 21 on four of its six faces, typically left, right, front and rear. Convoluted foam cushion 20 serves as a bed to protect the bottom portion of part 21.

Figure 3:
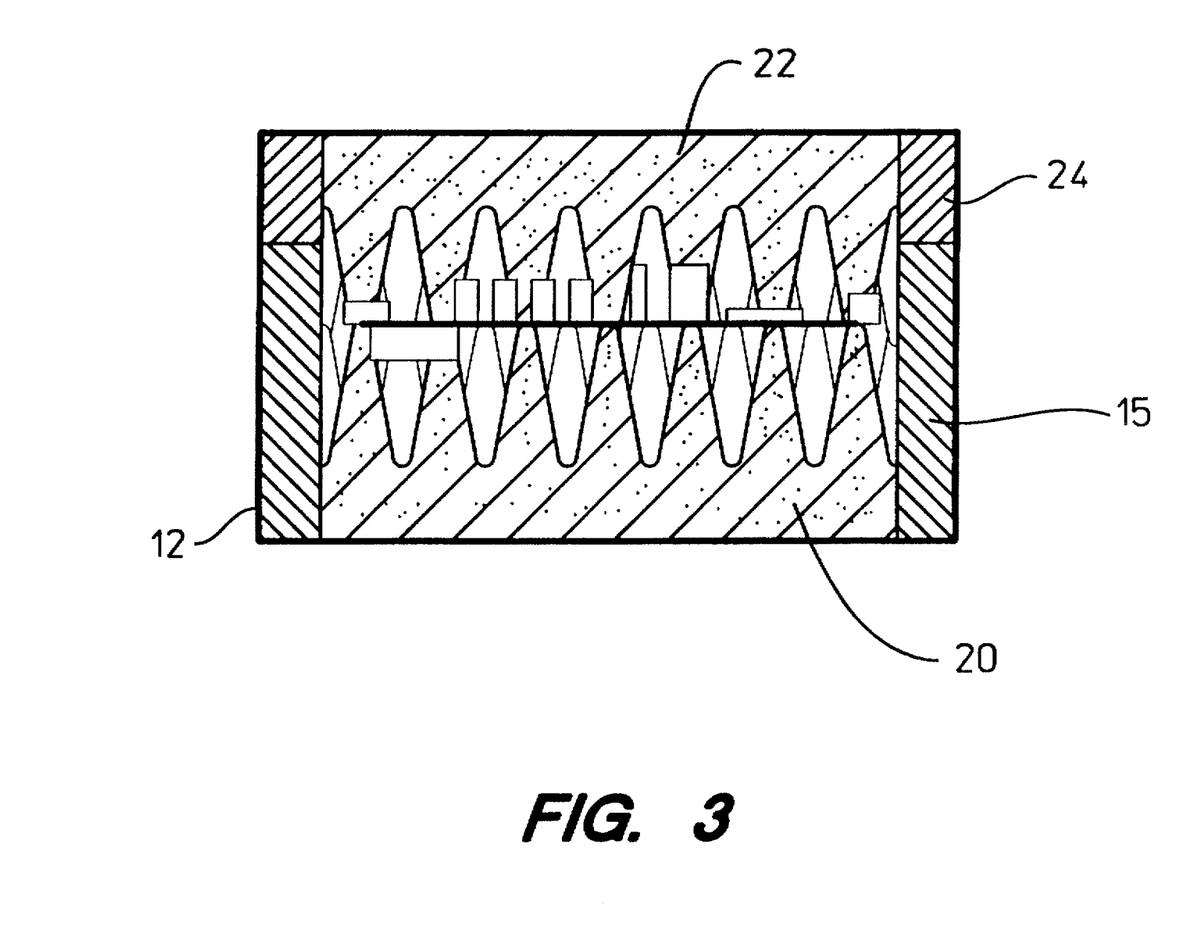
FIG. 3 is a cross-sectional view of the container assembly taken along center line I—I of FIG. 2 in a completely assembled configuration.

Cushion 22 serves to protect the top portion of part 21, and acts as a sort of "clamp," as will be explained, to hold part 21 securely in place. Cushion 22 may be adjustably positioned either in or out of the peripheral constraining walls of cushion liner 15 variously to suit the size and/or shape of the part being packaged. An important aspect of this invention is that cushion 22 in conjunction with cushion liner 15 clamps part 21 securely to the mating convoluted cushion 20. This is due to the frictional forces of the foam fingers being engaged and the frictional forces of the side walls of cushions 20 and 22 against liner 15. The initial clamping force is provided either manually or by an automated packaging machine during the packaging of the part or during a loading operation. As the flaps of corrugated box 12 or other closure means are pressed against the assembly, it clamps cushions 22 and 20 to permanently secure the part in its cushioned nest until it is opened by a customer or end user. FIG. 3 depicts a cross section of box 12 taken along section I—I to illustrate the cushioned nest produced by container assembly 10.

The foam convolutions being interlocking "fingers" do provide some frictional side restraint against lateral shock impacts, depending upon the attributes of part 21 and the amount of clamping pressure exerted between part 21 and foam cushions 20 and 22. But, inner sleeve 15 assures that protective cushioning is always present for left, right, front and rear shock impacts. In other words, lateral shock protection is not left to chance as on many conventional convoluted foam packing applications.

For particular utility with this invention, none of the cushions should be glued or otherwise permanently affixed to the inner surfaces of box 12. This feature allows packaging assembly 10 to be reused many times over (depending on the type of parts being packaged) and also easily disassembled for convenient storage. And, parts of practically any size, shape or irregular contour can be readily and economically secured in a family of standard sizes, depending on the needs of the application. This increases its flexibility and reuseablity to the manufacturer of a large number of parts of different sizes and shapes or to what is commonly referred to as a repair and return facility. Clearly this embodiment of the invention provides a much simpler, easier to use, and far more reusable, economical, and reliable shipping container assembly than any other prior art structure.

The embodiment heretofore described is intended to be applicable to a wide variety of pads of any practical size— nominally 1 to 40 lbs and less than 75 cm in length. Yet there are admittedly a class of delicate parts that have to be shipped and that are too small to be economically handled by the family of standard sizes heretofore described. To this end there are alternative embodiments that employ the modularity concept and that are designed to provide tooling economy by establishing a range of packaging sizes. Such alternative embodiments would provide packaging for a much larger number of part types and sizes for a particular business, such as in the field of computers and electronic instrument support. Common tooling can be designed and sized to manufacture all of the respective foam set sizes.

Figure 4:
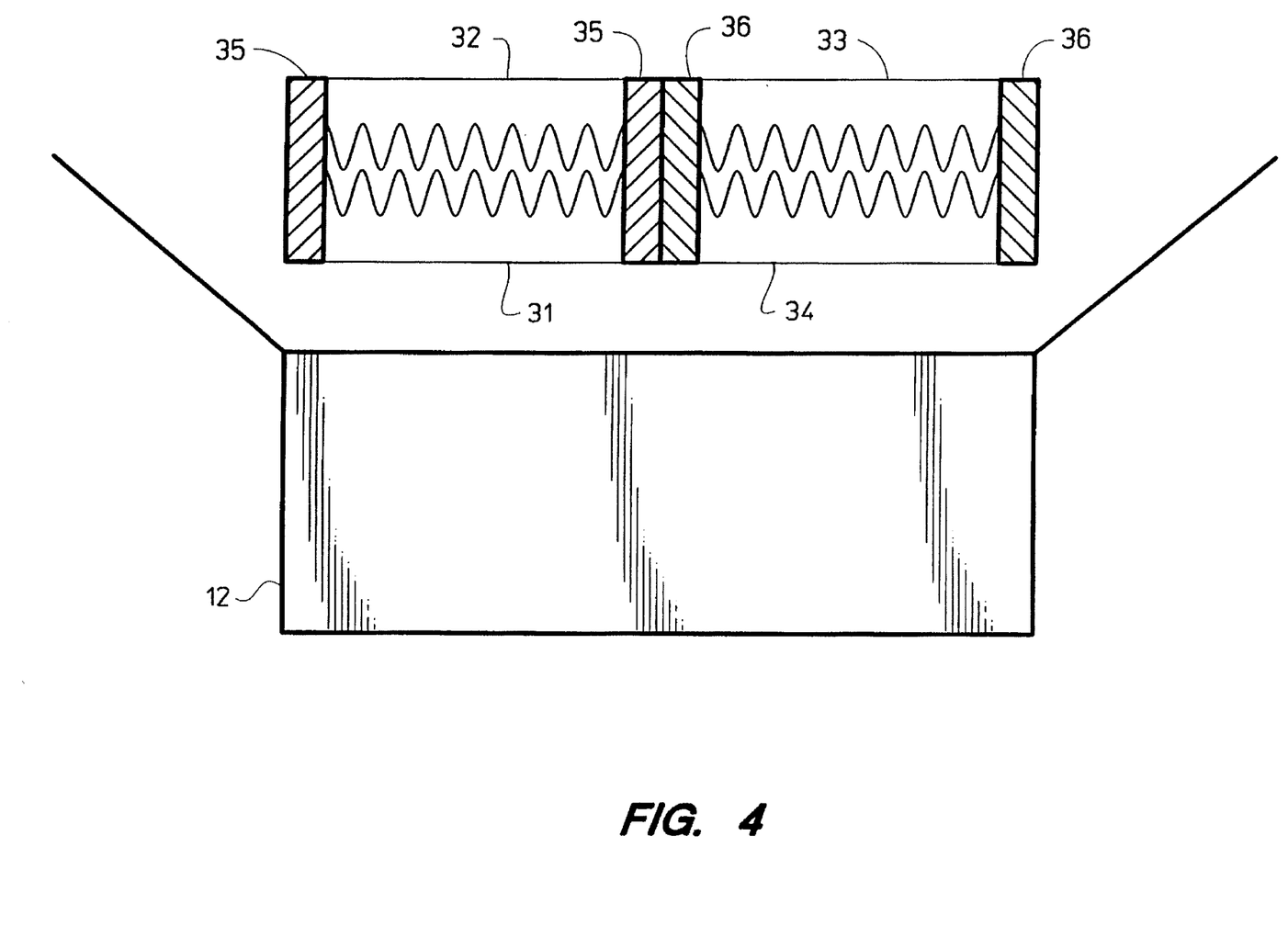
FIG. 4 is a partially exploded cross-sectional view of an alternative embodiment of the container assembly shown in FIGS. 2 and 3.

Referring to FIG. 4 there is shown a cross-sectional partially exploded view of an alternate embodiment of the present invention that may be used for packing and shipping a pair of delicate parts in one corrugated box container. This embodiment would be applicable to those situations where the parts to be shipped are relatively small in comparison to the overall dimensions of box 12. Corrugated box 12 is the same standard rectangular box design having four top and bottom flaps, as shown in FIGS. 1 and 2. However, it can be seen that the convoluted foam set 20, 22 has been replaced by two smaller convoluted foam sets 31, 32 and 33, 34 both of which provide a cushioned container for individual parts (not shown in FIG. 4). And, cushion liner 15 has been replaced by two cushion liners 35 and 36 which provide lateral protection to any part placed between the two foam sets 31, 32 and 33, 34, respectively. In this configuration the two foam sets 31, 32 and 33, 34 are the smallest "standard size" foam sets in a family of containers, and box 12 is an intermediate size in the family. Although it is not clearly depicted in FIG. 4 due to the exploded nature of the drawing, a recess similar to feature 24 in FIG. 3 exists between the upper surface of foam cushions 32 and 33 and the top of box 12. The function is similar to that already described in relation to FIG. 3, namely, to provide an area of possible expansion to accommodate bulging cushions. Where a manufacturer requires both articles to arrive at the same time this embodiment is a perfect way to handle such needs. In other words, the shipping container assembly may not only be reused, but also reconfigured to meet the changing needs of the shipper/user. Although FIG. 4 depicts two foam sets in one standard rectangular box, certainly a greater number could be accommodated by using the same modularity or building block concept and by adjustments being made to the dimensions of box 12.

Figure 5:
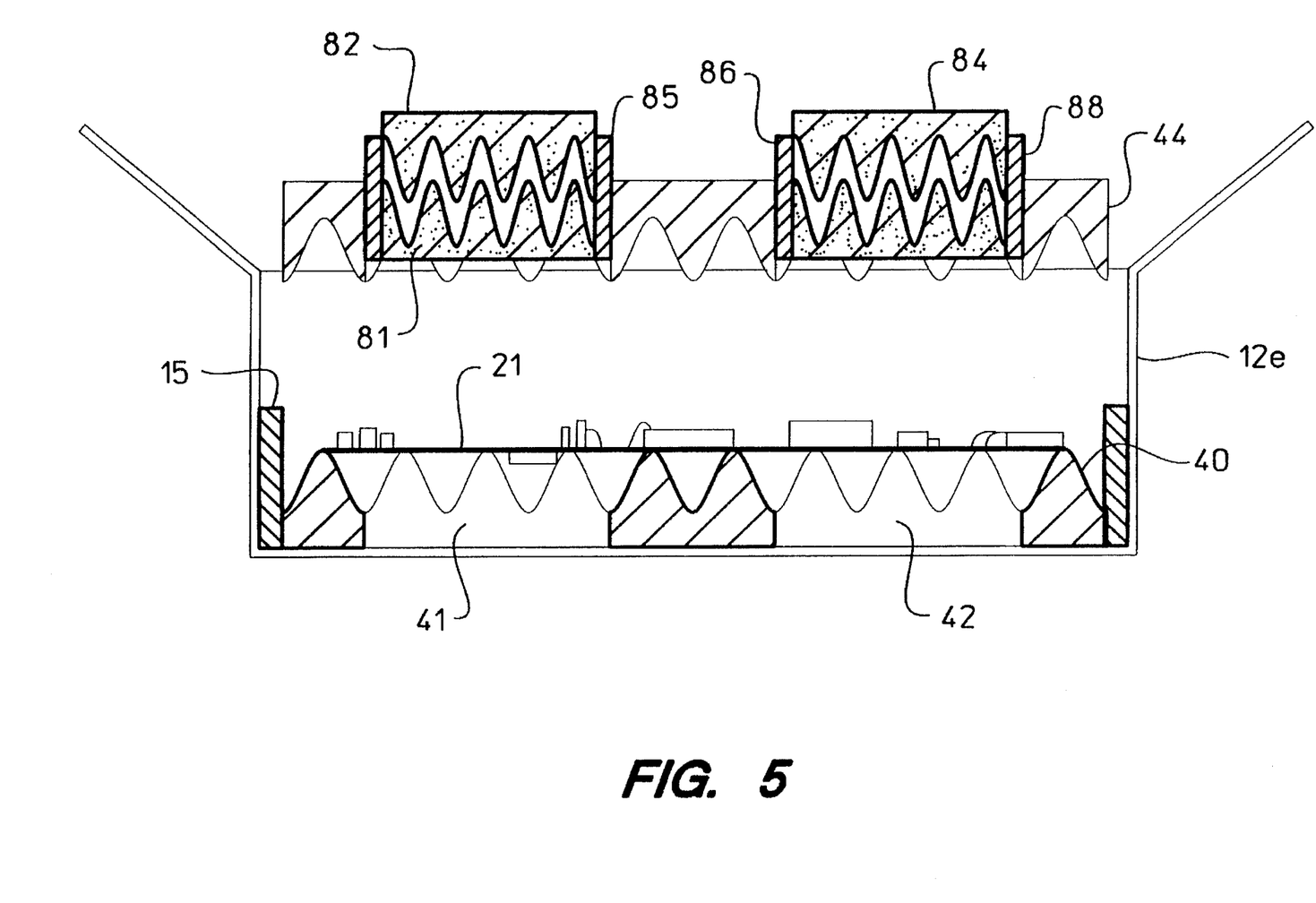
FIG. 5 is a partially exploded cross-sectional view of an alternative embodiment of the container assembly shown in FIGS. 2 an 3.

FIG. 5 illustrates, in accordance with the present invention, a further application of the basic container assembly heretofore described. Except for corrugated box 12e and part 21, the container assembly depicted in FIG. 5 is made from a single block of foam material similar to that used to make the foam structure shown in FIG. 2. In FIG. 5 cushion liner 15 is the same liner as that which is shown in FIG. 2 and performs the same function. Convoluted foam set 40, 44 is similar to cushions 20, 22 shown in FIG. 2, except that two additional convoluted foam sets have been made therefrom, namely, 81, 82 and 84, 88. Both foam sets have associated cushion liners 85 and 86 respectively. The two additional convoluted foam sets and their associated liners are cut or stamped from foam set 40, 44 and are situated for packing purposes in the void left in foam cushion 44 after it has been cut. As shown in the figure this structure accommodates a standard size article (depicted as a pc board 21) and two much smaller pads (not shown) situated between two foam sets 81, 82 and 84, 88. The final assembly includes part 21, which is disposed upon cushion 40 and voids 41 and 42 therein; upper cushion 44, which is disposed immediately above part 21 and cushion 40; and foam sets 81, 82 and 84, 88 (and liners 85 and 86) which are disposed partially within the voids created within cushion 44 created during fabrication. The upper part of foam sets 81, 82 and 84, 88 (and liners 85 and 86) occupy a recess left between the top surface of cushion 44 and the top wall of box 12e. (Box 12e has to be slightly extended over the height dimension of box 12 in FIG. 2 to produce a wider recess to accommodate the 2 additional foam sets.) Once all cushions are in place with the parts to be shipped enclosed therein, the flaps of box 12e are closed and sealed to exert a force on upper cushions 82 and 84 for holding the assembly, and the parts to be shipped, in their final configuration. Although only two smaller foam sets are shown in FIG. 5, a greater number would be possible depending upon the dimensions of the added foam sets (81, 82 and 84, 88) relative to the dimensions of foam set 40, 44.

Figure 6A:
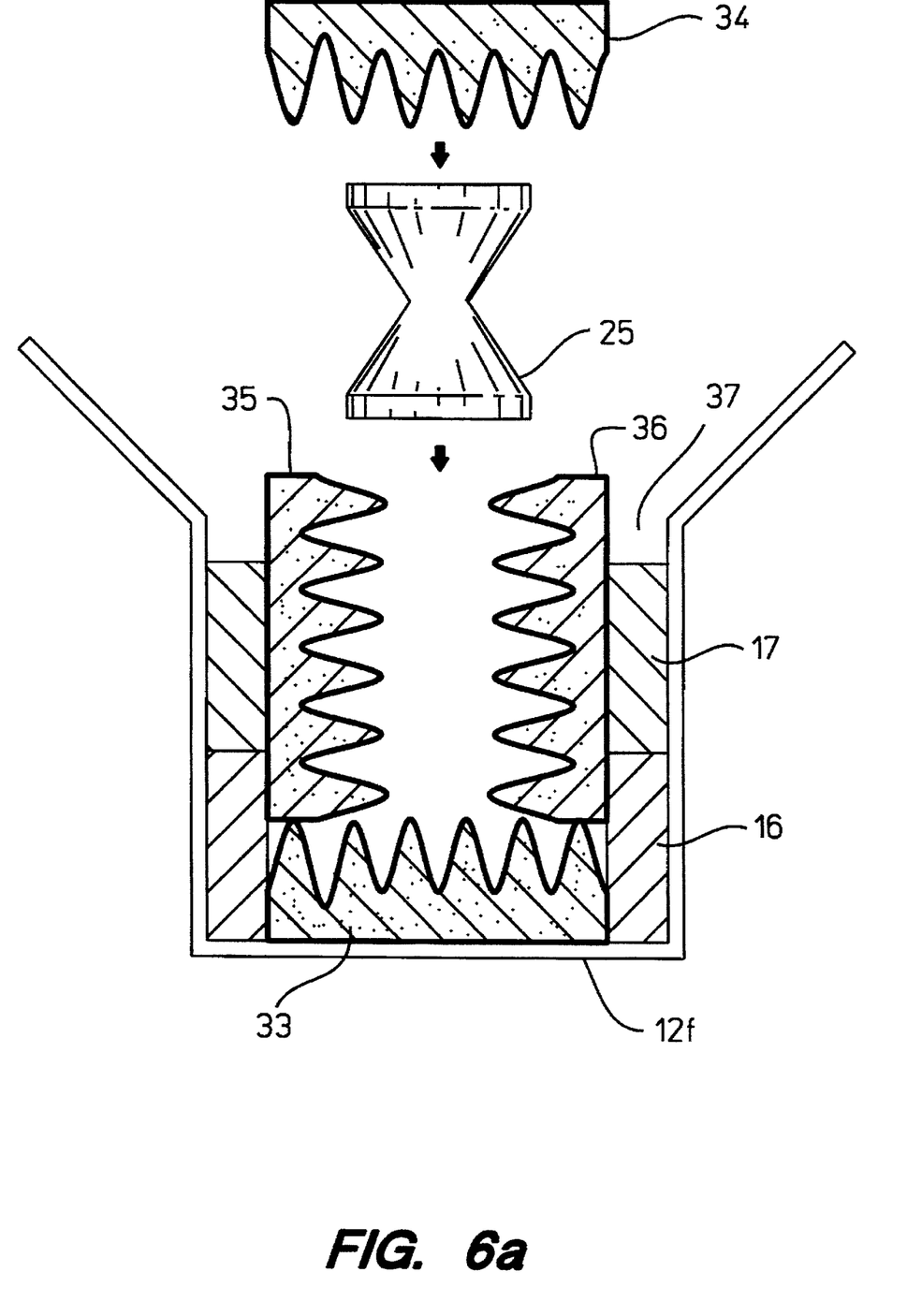
FIG. 6a is a partially exploded cross-sectional view of an alternative embodiment of the subject invention.
Figure 6B:
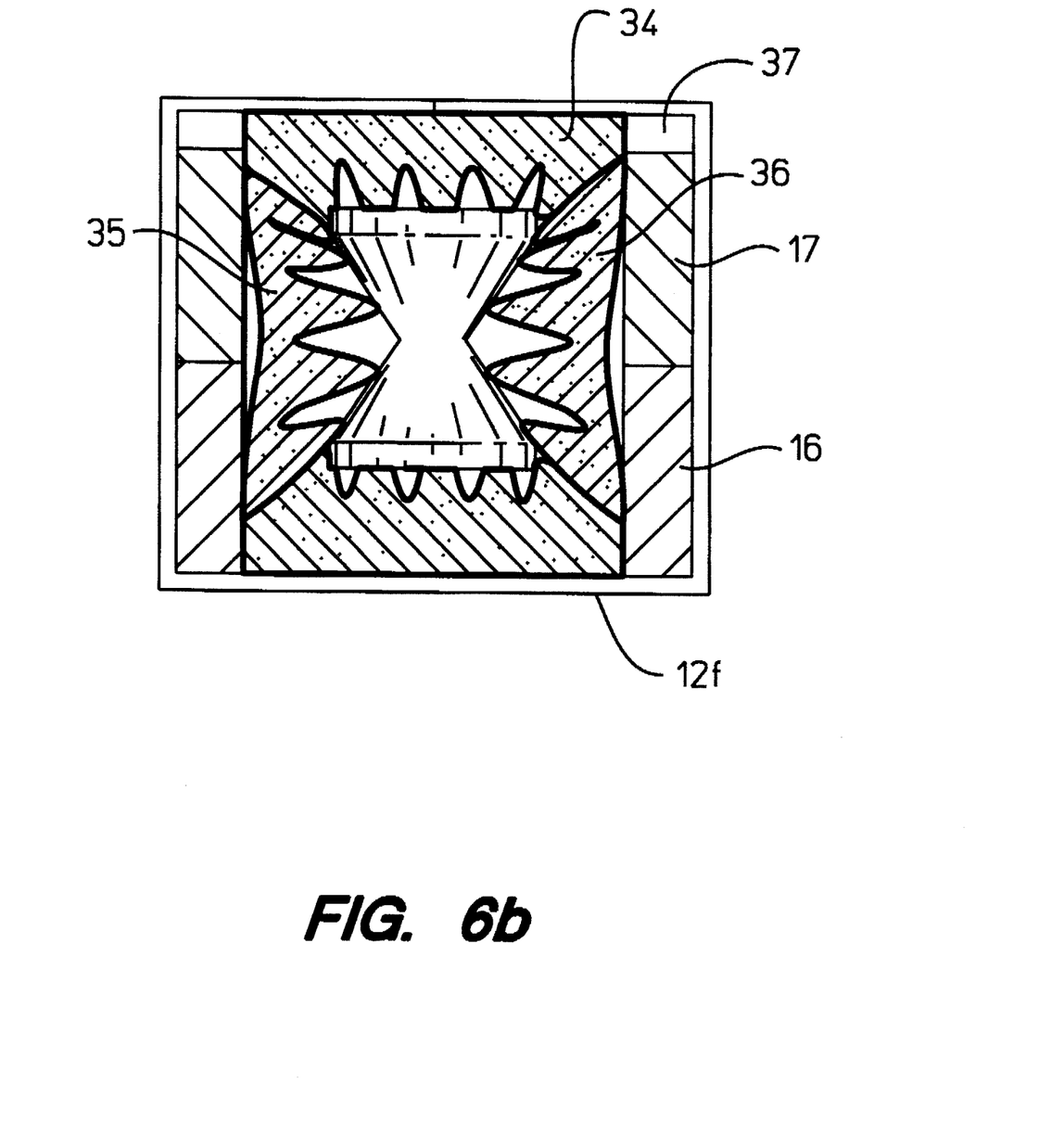
FIG. 6b is a cross-sectional view of the container assembly shown in FIG. 6a shown completely assembled and ready for shipping with a typical part therein.

The above illustrated and described preferred embodiments of the invention may be altered in a variety of ways and still remain within the spirit and scope of the invention. Yet another example of the versatility of this invention is shown in FIGS. 6a and 6b. The container assembly shown in these two figures uses the modularity concept in a somewhat different manner to obtain mutual restraint of an hour-glass shaped part 25 in both the vertical (or axial) direction and in lateral directions. FIG. 6a is a partially exploded view of the container assembly shown in FIG. 6b. In this configuration two matching foam sets are employed 33, 34 and 35, 36 with matching foam sleeves 16 and 17. The two sleeves 16 and 17 are preferably cut from the same foam block as the two foam sets and form a bifurcated sleeve whose total length equals the combined length of the two. A recess 37 above the upper foam sleeve 17 and the top of corrugated box 12f is reserved for compensating the bulge to be expected when the part 25 is inserted. FIG. 6a is provided to illustrate the preferred manner of assembling the container assembly. The two sleeves 16 and 17 are preferably inserted first, and then lower foam cushion 33 is placed on the bottom of box 12f as illustrated. Next the convoluted foam set 35, 36 is disposed on opposite sides of box 12f as illustrated. Then part 25 is carefully inserted into the empty cavity of the box and upper foam cushion 34 is placed on top of part 25 for clamping the part within box 12f in conjunction with the top flaps of box 12f. The upper foam cushion 34 pushes down on part 25 and the two lateral foam cushions to cause a temporary deformation of the cushions. As can be seen an inward lateral clamping action on the part results as well as the vertical clamping action illustrated in the previous examples. It should be observed that the overall effect is a fully supported part that is cushioned in all directions.

Another major advantage of the subject invention is that when the boxes are too worn to be reused, they may be shredded for recycling. Similarly the foam sets and liners may also be recycled. When they are too worn to be reused, they get shredded by a recycled for use in other commercial products.

Accordingly, the disclosure of the present invention is intended to be illustrative, but not limiting, of the scope of the invention, which is set forth in the following claims.

What is claimed is:

1. A reusable cushioned shipping container assembly for protecting an article during shipping and storage, said container assembly comprising in combination:

an outer semi-rigid corrugated box providing a top wall, a bottom wall and a plurality of side walls of depth "d", said box having a plurality of corrugated flaps each being connected to a corresponding side wall for forming said top and bottom walls;

support and cushioning means locatable within said box and contacting the inner surfaces of each of said side walls and said bottom wall to hold and cushion said article within said corrugated box, said support and cushioning means being removable from said corrugated box and further comprising:

a first flexible cushion providing a sleeve for covering at least a substantial portion of the interior of said side walls, said first flexible cushion having a uniform thickness sufficient to provide lateral shock protection to an article placed within said corrugated box;

a second flexible cushion having a flat bottom surface for contacting said bottom wall, a convoluted upper surface, and a plurality of side walls, said second flexible cushion for abutting said first flexible cushion when said second flexible cushion is disposed within said box, said second flexible cushion having an average thickness <½ d; and a third flexible cushion having a flat top surface, a convoluted bottom surface for mating with said convoluted upper surface of said second flexible cushion, and a plurality of side walls for abutting said first flexible cushion when disposed within said box, said third flexible cushion having an average thickness <½ d, and said convoluted surfaces of said second and third flexible cushions for passively holding and protecting said article during shipment and storage;

said first flexible cushion dimensioned to snugly receive and hold said second and third flexible cushions in a mated position within said corrugated box.

2. A reusable cushioned shipping container as defined in claim 1 wherein said first, second, and third cushions are of the same material.

3. A reusable cushioned shipping container as defined in claim 2 wherein said first cushion has a depth dimension $d_1$, where $0.5\ d \leq d_1 \leq 0.95\ d$.

4. A reusable cushioned shipping container as defined in claim 3 wherein said second and third cushions have an average depth dimension of $d_2$ and $d_3$ respectively, where $0.5\ d \leq (d_2+d_3) \leq 0.95\ d$.

5. A reusable cushioned shipping container as defined in claim 4 wherein said corrugated box is rectangularly shaped.

6. A reusable cushioned shipping container as defined in claim 5 wherein said first, second, and third cushions are made of polyurethane foam and have the same foam density.

7. A reusable cushioned shipping container as defined in claim 6 wherein said first, second, and third cushions are fabricated from a single block of polyurethane foam.

8. A reusable shipping container assembly for protecting at least one fragile article during shipping, said container assembly comprising in combination:

an outer corrugated box structure having a top wall, a bottom wall and a pair of opposing side walls of depth "d", said box also having a plurality of corrugated flaps each being connected to a corresponding side wall for forming said top and bottom walls;

a cushioned liner made of a resilient material and locatable within said corrugated box structure for lining a substantial portion of the inner surfaces of each of said side walls and contacting said bottom wall, said cushioned liner having a uniform thickness sufficient to provide lateral shock protection to said article placed within said corrugated box;

a first flexible cushion having a bottom surface for contacting said bottom wall, a convoluted upper surface for intimately contacting and supporting said article, and a pair of opposing side walls, said first flexible cushion closely abutting said cushioned liner when said cushioned liner and said first flexible cushion are disposed within said corrugated box; and a second flexible cushion having a top surface, a convoluted bottom surface for mating with said convoluted upper surface of said first flexible cushion, and a pair of opposing side walls for closely abutting said cushioned liner when disposed within said corrugated box, said convoluted surfaces of said first and second flexible cushions for passively holding and protecting said article during shipment;

said cushioned liner dimensioned to snugly receive and hold said first and second cushions in a mated position within said corrugated box.

9. A reusable cushioned shipping container as defined in claim 8 wherein the average depth of said first and second flexible cushions are the same.

10. A reusable cushioned shipping container as defined in claim 9 wherein said cushioned liner has a depth dimension $d_1$, where $0.5\ d \leq d_1 \leq 0.95\ d$.

11. A reusable cushioned shipping container as defined in claim 10 wherein said second and third cushions have an average depth dimension of $d_2$ and where $0.5\ d \leq 2d_2 \leq 0.95\ d$.

12. A reusable cushioned shipping container as defined in claim 8 additionally comprising:

- a third flexible cushion having a bottom surface for contacting said bottom wall, a convoluted upper surface for intimately contacting and supporting said article, and a pair of opposing side walls, said third flexible cushion closely abutting said cushioned liner when said cushioned liner and said third flexible cushion are disposed within said corrugated box; and

- a fourth flexible cushion having a top surface, a convoluted bottom surface for mating with said convoluted upper surface of said third flexible cushion, and a pair of opposing side walls for closely abutting said cushioned liner when disposed within said corrugated box, said convoluted surfaces of said third and fourth flexible cushions for passively holding and protecting said article during shipment;

- said cushioned liner dimensioned to snugly receive and hold said third and fourth cushions in a mated position within said corrugated box.

13. A reusable cushioned shipping container as defined in claim 12 wherein said cushioned liner comprises two cushioned liner sections, a first cushioned liner segment receiving and holding said first and second cushions within said corrugated box, and a second cushioned liner segment receiving and holding said third and fourth cushions within said corrugated box.

14. A reusable cushioned shipping container as defined in claim 8 additionally comprising:

- an additional convoluted foam set including a pair of rectangular-shaped convoluted foam cushions, each rectangular-shaped convoluted foam cushion having at least one convoluted side facing the interior of said corrugated box for cushioning therebetween an additional article; and

- said cushioned liner dimensioned to snugly receive and hold said pair of rectangular-shaped convoluted foam cushions in a mated position within said corrugated box.

15. A reusable cushioned shipping container as defined in claim 14 wherein said cushioned liner comprises two cushioned liner sections, a first cushioned liner segment receiving and holding said first and second cushions within said corrugated box, and a second cushioned liner segment receiving and holding said pair of rectangular-shaped convoluted foam cushions within said corrugated box.

* * * * *